United States Patent
Kerns et al.

(10) Patent No.: US 7,549,283 B2
(45) Date of Patent: Jun. 23, 2009

(54) ENGINE SYSTEM WITH MIXED EXHAUST GAS OXYGEN SENSOR TYPES

(75) Inventors: James Kerns, Trenton, MI (US); Gopichandra Surnilla, West Bloomfield, MI (US); Tobias Pallett, Farmington Hills, MI (US); Sukhdev Sekhon, Taylor, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 473 days.

(21) Appl. No.: 11/217,733

(22) Filed: Aug. 31, 2005

(65) Prior Publication Data
US 2005/0284133 A1     Dec. 29, 2005

Related U.S. Application Data

(63) Continuation-in-part of application No. 10/794,494, filed on Mar. 5, 2004, now Pat. No. 7,021,046.

(51) Int. Cl.
*F01N 3/00* (2006.01)
(52) U.S. Cl. .................................. 60/285; 60/276
(58) Field of Classification Search .................... 60/276, 60/285, 299
See application file for complete search history.

(56) References Cited

U.S. PATENT DOCUMENTS

| | | | | |
|---|---|---|---|---|
| 5,749,221 A | * | 5/1998 | Kawahira et al. | 60/274 |
| 5,832,724 A | * | 11/1998 | Watanabe et al. | 60/276 |
| 6,282,888 B1 | * | 9/2001 | Sealy et al. | 60/274 |
| 6,301,880 B1 | * | 10/2001 | Cullen et al. | 60/274 |
| 6,389,806 B1 | * | 5/2002 | Glugla et al. | 60/284 |
| 6,415,601 B1 | * | 7/2002 | Glugla et al. | 60/284 |
| 6,438,946 B1 | * | 8/2002 | Majima et al. | 60/285 |
| 6,567,738 B2 | * | 5/2003 | Gopp et al. | 701/109 |
| 6,581,371 B1 | * | 6/2003 | Orzel et al. | 60/277 |

* cited by examiner

*Primary Examiner*—Thomas E Denion
*Assistant Examiner*—Diem Tran
(74) *Attorney, Agent, or Firm*—Julia Voutyras; Alleman Hall McCoy Russell & Tuttle LLP

(57) ABSTRACT

In one example, a system for a vehicle traveling on the road is described. The system includes a first cylinder; a second cylinder; a linear exhaust gas sensor coupled exclusively to said first cylinder; a switching exhaust gas sensor coupled exclusively to said second cylinder; and a controller configured to operate in a first mode with both said first and second cylinders carrying out lean combustion, where fuel injection amounts to each of said first and second cylinder are adjusted based on said linear sensor; said controller further configured to operate in a second mode with both said first and second cylinders carrying out combustion about stoichiometry, where fuel injection amounts to at least one of said first and second cylinder are adjusted based on said switching sensor.

21 Claims, 8 Drawing Sheets

ENGINE SYSTEM WITH MIXED EXHAUST GAS OXYGEN SENSOR TYPES

The present application is a continuation-in-part of U.S. patent application Ser. No. 10/794,494, filed Mar. 5, 2004, now U.S. Pat. No. 7,021,046 the entire contents of which are incorporated herein by reference for all purposes.

BACKGROUND AND SUMMARY

Internal combustion engines utilize feedback from exhaust gas oxygen sensors to maintain desire air-fuel ratio mixtures during combustion, at least under some conditions. Various types of exhaust gas oxygen sensors may be used, such as linear type sensors (sometimes referred to as UEGO sensors), and switching type sensors (sometimes referred to as EGO, or HEGO, sensors, depending on whether a heater is included).

The inventors herein have recognized that under some conditions, it may be advantageous to utilize a switching type sensor, such as when operating about stoichiometry, as it may be possible to have a more accurate identification of stoichiometry through operating conditions and sensor aging. Further, it may be advantageous to utilize a linear type sensor, such as when operating away from stoichiometry (e.g., lean), as it may be possible to have a more accurate identification of air-fuel ratios over a broader range. However, the additional costs of adding sensors typically forces selection of a single sensor type for any given exhaust location, at least in some systems.

One approach that attempts to use both types of sensor places one type of sensor upstream of a catalyst, and another type of sensor downstream of the catalyst. See, for example, U.S. Pat. Nos. 6,567,738 and 5,832,724. However, the inventors herein have recognized that whichever selection is made, each has disadvantages, such as noted above. Further, these disadvantages can be exacerbated when operating in a partial cylinder deactivation condition, where some cylinders operate with combustion, and others operate in a fuel cut condition.

The above issue may be addressed by, in one example, a system for a vehicle traveling on the road. The system comprises: a first cylinder; a second cylinder; a linear exhaust gas sensor coupled exclusively to said first cylinder; a switching exhaust gas sensor coupled exclusively to said second cylinder; and a controller configured to operate in a first mode with both said first and second cylinders carrying out lean combustion, where fuel injection amounts to each of said first and second cylinder are adjusted based on said linear sensor; said controller further configured to operate in a second mode with both said first and second cylinders carrying out combustion about stoichiometry, where fuel injection amounts to at least one of said first and second cylinder are adjusted based on said switching sensor.

In another example, a system for a vehicle traveling on the road is provided. The system comprises: a first cylinder; a second cylinder; a linear exhaust gas sensor coupled exclusively to said first cylinder; a switching exhaust gas sensor coupled exclusively to said second cylinder; and a controller configured to operate in a first mode with said first cylinder carrying out lean combustion and said second cylinder operating without injected fuel, where fuel injection amounts to said first cylinder are adjusted based on said linear sensor; said controller further configured to operate in a second mode with said second cylinder carrying out combustion about stoichiometry and said first cylinder operating without injected fuel, where fuel injection amounts to said second cylinder are adjusted based on said switching sensor.

In this way, when operating in a stoichiometric partial cylinder cut operation, a switching type sensor can be both upstream of a catalyst and isolated from the air pumped through the fuel cut cylinders. Likewise, when operating in lean partial cylinder cut operation, a linear type sensor can also be upstream of a catalyst.

Further, it is also possible to obtain the advantage of each type of sensor when operating with both cylinders carrying out combustion in either a lean or stoichiometric mode. For example, the linear type sensor can be used during lean combustion to control both cylinder groups. Likewise, the switching type sensor can be used during stoichiometric combustion to control both cylinder groups.

BRIEF DESCRIPTION OF THE FIGURES

The above features and advantages will be readily apparent from the following detailed description of example embodiment(s). Further, these features and advantages will also be apparent from the following drawings.

DETAILED DESCRIPTION OF EXAMPLE EMBODIMENT(S)

Figure 1:
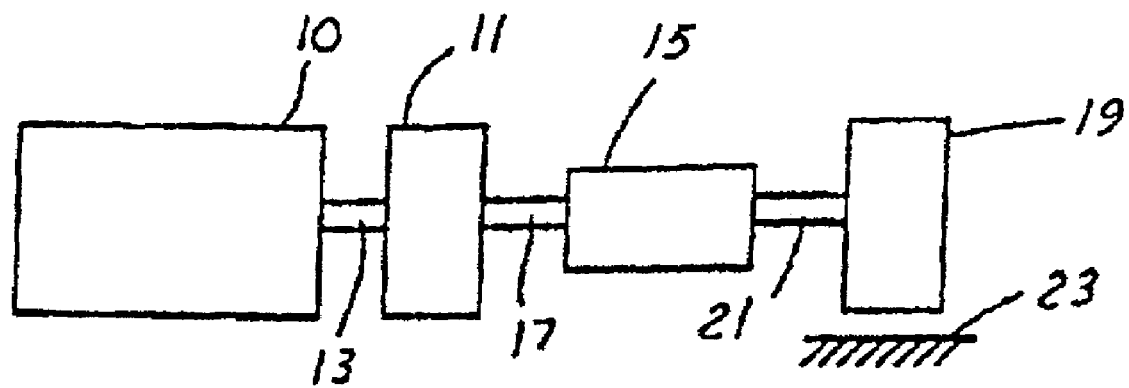
FIG. 1 is a block diagram of a vehicle illustrating various components of the powertrain system.
Figure 1A:
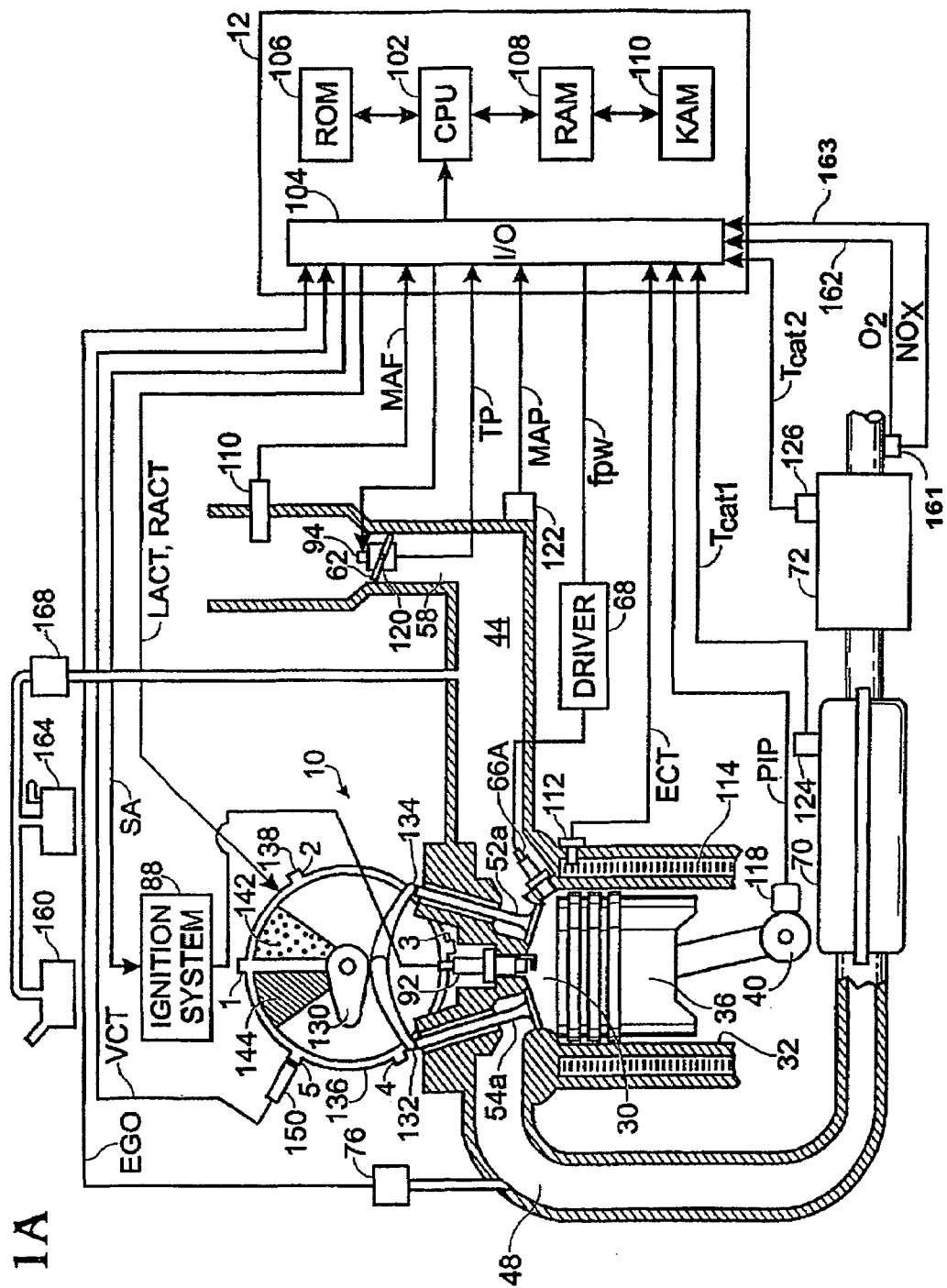
FIGS. 1A and 1B show a partial engine view.
Figure 1B:
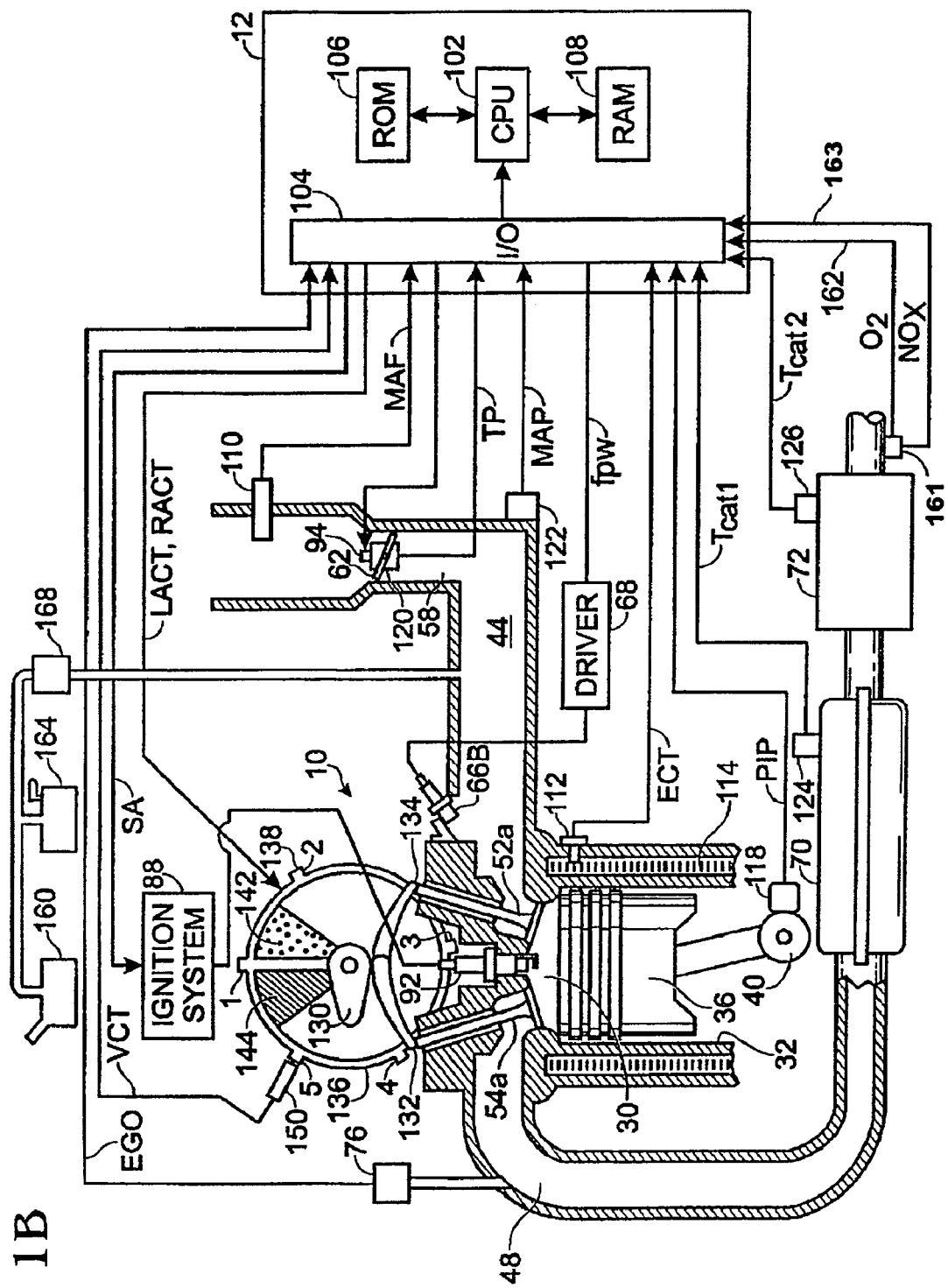

Referring to FIG. 1, internal combustion engine 10, further described herein with particular reference to FIGS. 1A and 1B, is shown coupled to torque converter 11 via crankshaft 13. Torque converter 11 is also coupled to transmission 15 via turbine shaft 17. Torque converter 11 has a bypass, or lock-up clutch (not shown) which can be engaged, disengaged, or partially engaged. When the clutch is either disengaged or partially engaged, the torque converter is said to be in an unlocked state. The lock-up clutch can be actuated electrically, hydraulically, or electro-hydraulically, for example. The lock-up clutch receives a control signal (not shown) from the controller, described in more detail below. The control signal may be a pulse width modulated signal to engage, partially engage, and disengage, the clutch based on engine, vehicle, and/or transmission operating conditions. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

FIGS. 1A and 1B show one cylinder of a multi-cylinder engine, as well as the intake and exhaust path connected to that cylinder. As described later herein with particular reference to FIG. 2, there are various configurations of the cylinders and exhaust system, as well as various configuration for the fuel vapor purging system and exhaust gas oxygen sensor locations.

Continuing with FIG. 1A, direct injection spark ignited internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70 (note that sensor 76 corresponds to various different sensors, depending on the exhaust configuration as described below with regard to FIG. 2). Sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or NOx trap 72. (Again, note that emission control devices 70 and 72 can correspond to various devices described in FIGS. 2A-C). Also note that various types of purging systems can be used, as described in more detail below with regard to FIGS. 2A-C.

Controller 12 is shown in FIG. 1A as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 110 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give and indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1A, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52*a*, 52*b* and exhaust valves 54*a*, 54*b* open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52*a*, 52*b*, and exhaust valves 54*a*, 54*b* open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 161 provides an indication of both oxygen concentration in the exhaust gas as well as NOx concentration. Signal 162 provides controller a voltage indicative of the O2 concentration while signal 163 provides a voltage indicative of NOx concentration. Alternatively, sensor 161 can be a HEGO, UEGO, EGO, or other type of exhaust gas sensor. Also note that, as described above with regard to sensor 76, sensor 161 can correspond to various different sensors depending on the system configuration, as described in more detail below with regard to FIG. 2.

As described above, FIGS. 1A (and 1B) merely show one cylinder of a multi-cylinder engine, and that each cylinder has its own set of intake/exhaust valves, fuel injectors, spark plugs, etc.

Referring now to FIG. 1B, a port fuel injection configuration is shown where fuel injector 66B is coupled to intake manifold 44, rather than directly cylinder 30. The remainder of FIG. 1B is similar to that of FIG. 1A.

Also, in the example embodiments described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used, if desired.

Also note that various methods can be used to maintain the desired torque such as, for example, adjusting ignition timing, throttle position, variable cam timing position, exhaust gas recirculation amount, and a number of cylinders carrying out combustion. Further, these variables can be individually adjusted for each cylinder to maintain cylinder balance among all the cylinder groups.

Figure 2A:
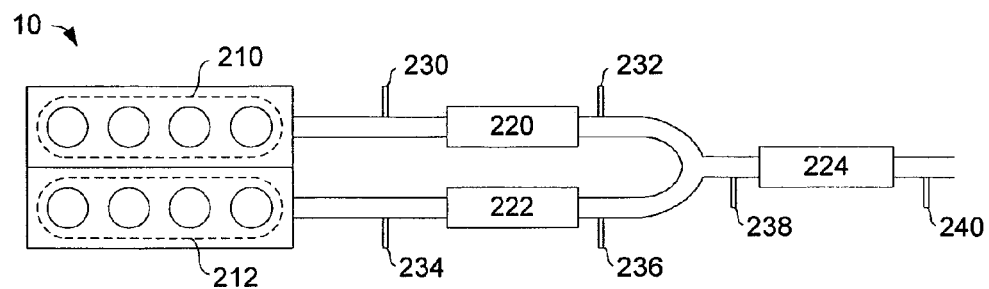
FIGS. 2A-2D show various schematic system configurations.

Referring now to FIG. 2A, a first example configuration is described using a V-8 engine, although this is simply one example, since a V-10, V-12, I4, I6, V6, etc., could also be used. Note that while numerous exhaust gas oxygen sensors are shown, a subset of these sensors can also be used. Further, only a subset of the emission control devices can be used, and a non-y-pipe configuration can also be used. As shown in FIG. 2A, cylinders of a first combustion chamber group 210 are coupled to the first catalytic converter 220, while cylinders of a second combustion chamber group 212 are coupled to the second catalytic converter 222. Upstream of catalyst 220 and downstream of the first cylinder group 210 is an exhaust gas oxygen sensor 230. Downstream of catalyst 220 is a second exhaust gas sensor 232. In this example, groups 210 and 212 each have four cylinders. However, either group 210 or group 212 could be divided into other groups other than a cylinder bank. For example, if the exhaust manifolds were coupled to two cylinders in group 210 and two cylinders in group 212, this can constitute a cylinder group coupled to catalyst 220.

Upstream and downstream of catalyst 220 are exhaust gas oxygen sensors 234 and 236, respectively. Exhaust gas exiting from the first and second catalyst 220 and 222 merge in a Y-pipe configuration before entering downstream under body catalyst 224. Also, exhaust gas oxygen sensors 238 and 240 are positioned upstream and downstream of catalyst 224, respectively.

In one example embodiment, catalysts 220 and 222 are platinum and rhodium catalysts that retain oxidants when operating lean and release and reduce the retained oxidants when operating rich. Further, these catalysts can have multiple bricks, and further these catalysts can represent several separate emission control devices.

Similarly, downstream underbody catalyst 224 also operates to retain oxidants when operating lean and release and reduce retained oxidants when operating rich. As described above, downstream catalyst 224 can be a group of bricks, or several emission control devices. Downstream catalyst 224 is typically a catalyst including a precious metal and alkaline earth and alkaline metal and base metal oxide. In this particular example, downstream catalyst 224 may contain platinum and barium.

Note that various other emission control devices could be used, such as catalysts containing palladium or perovskites. Also, exhaust gas oxygen sensors 230 to 240 can be sensors of various types. For example, they can be linear oxygen sensors for providing an indication of air-fuel ratio across a broad range. Also, they can be switching type exhaust gas oxygen sensors that provide a switch in sensor output at the stoichiometric point. Also, the system can provide less than all of sensors 230 to 240, for example, only sensors 230, 234, and 240. In another example, only sensor 230, 234 are used with only devices 220 and 222.

In some cases, a more accurate identification of the stoichiometric location may be obtained via the switching type sensor, since it can be less sensitive to variation in the stoichiometric point over a range of operation conditions and aging. However, a more accurate identification of lean and/or rich air-fuel ratios may be obtained via the linear type sensor, since it can detect levels of air-fuel ratios over a greater range.

In one specific embodiment, mixed sensor types may be used. For example, sensor 230 may be a linear type sensor, sensors 234, 232, 236, may be switching type sensors, and sensor 240 may be a linear type sensor. As described below herein, such a configuration may be used to advantage during various modes of operation, such as, for example, partial cylinder fuel cut-out mode, split bank air-fuel ratio operation, decontamination cycles, and various others. Specifically, synergistic advantages may be obtained where the improved operation of each type of sensor can each be achieved, while reducing the respective disadvantages of each.

For example, when the system of FIG. 2A is operated in an AIR/LEAN mode, first combustion group 210 is operated at a lean air-fuel ratio (typically leaner than about 18:1) and second combustion group 212 is operated without fuel injection (but still pumping air). Thus, in this case, and during this operation, the exhaust air-fuel ratio is a mixture of air from the cylinders without injected fuel, and a lean air fuel ratio from the cylinders combusting a lean air-fuel mixture. In this way, it is possible to utilize the linear type sensor to accurately control the lean air-fuel ratio during this operation.

Continuing with this example, when the system is operated with both cylinder combusting air and fuel where stoichiometric operation is desired, accurate control of the air-fuel ratio may be achieved about stoichiometric conditions using both the linear and switching type sensor, along with downstream sensors. For example, air-fuel ratio of both cylinder groups may be adjusted based on the switching sensor, if desired.

Further, when the system is operated with both cylinder combusting air and fuel where lean operation is desired, accurate control of the air-fuel ratio of both groups may be achieved using both upstream (and downstream) linear type sensors. In other words, the high bandwidth errors in air-fuel ratio can be assumed to be relatively equal between the banks (as due to throttle changes, speed changes, etc.), and thus accurate lean control can be achieved. Further, less accurate air-fuel ratio control may be tolerated during lean operation, in some conditions.

In this way, it is possible to achieve the advantages of each type of sensor, without increasing the total number of sensors, and reducing costs (since switching type sensors may be less costly than linear type sensors).

Note that the engine can also operate in any of the 5 various modes described below with regard to FIG. 3, for example. Note that, as described in more detail below, the mode selected may be based on desired engine output torque, whether idle speed control is active, exhaust temperature, and various other operating conditions.

Also, while FIG. 2A shows a V-8 engine, various other numbers of cylinders could be used. For example, an I4 engine can be used, where there are two groups of two cylinders leading to a common exhaust path with and upstream and downstream emission control devices.

Figure 2B:
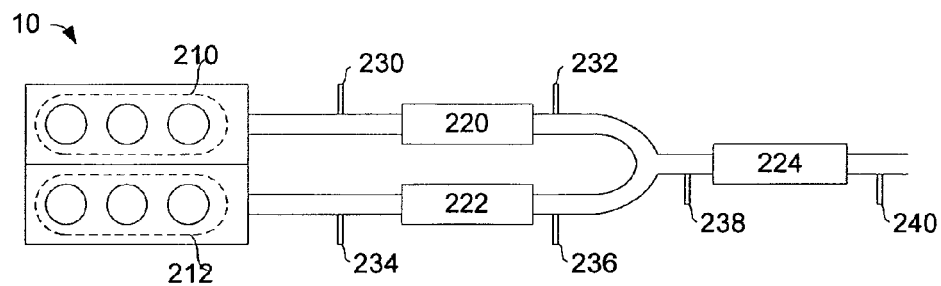

Referring now to FIG. 2B, a system similar to that in FIG. 2A is shown, however a V-6 type engine is shown, rather than a V-8 engine.

Figure 2C:
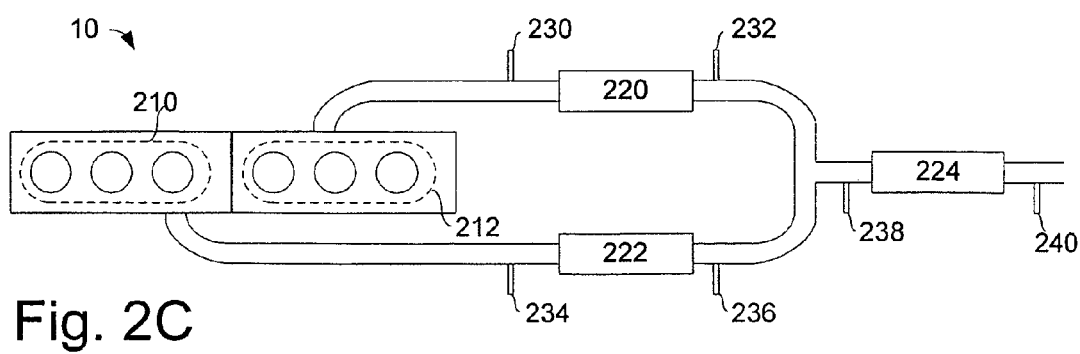

Referring now to FIG. 2C, a system similar to that in FIG. 2A is shown, however an inline type engine (I-6) is shown, rather than a V-8 engine.

Figure 2D:
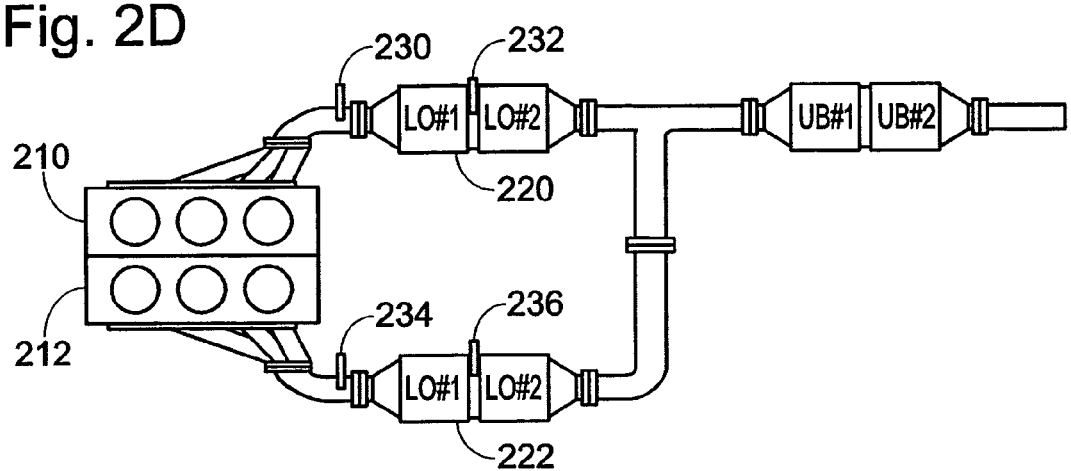

Referring now to FIG. 2D, a modification of the configuration shown in FIG. 2B is shown. Specifically, engine 10 is shown with two cylinder groups 210 and 212, which in this example correspond to respective cylinder banks of the V-6 engine. Further, only four sensors are shown, with sensor 230 and 234 located upstream of light-off catalyst (LO) canisters 220 and 222. Each light-off catalyst canister contains two catalyst bricks, such that each of canisters 220 and 222 contain a first light-off brick (LO#1) and a second light-off brick (LO#2). The downstream sensors 232 and 236 are each located respectively between the two light-off bricks LO#1 and LO#2, in this example. FIG. 2D also shows an underbody canister 224 containing two underbody catalyst bricks (UB#1 and UB#2).

As noted above, additional sensors may be used, as well as additional catalysts and/or catalyst bricks. Further, as noted herein, in one example sensor 234 may be a linear type sensor, where sensor 230 may be a switching type sensor, or vice versa. Further, sensor 232 and 236 may be either a switching type or linear type sensor. In an alternative embodiment, sensors 230 and 236 can be linear type sensors and sensor 232 and 234 can be switching type sensors.

There are various modes for operating the engine configurations FIGS. 2A-2D, some of which are listed below:

1. operate a first group of cylinders lean, and a other group inducting gasses without injected fuel;
2. operate the first group of cylinders about stoichiometric, and the other group inducting gasses without injected fuel;
3. operate the first group of cylinders rich, and the other group inducting gasses without injected fuel
4. operate the first group of cylinders lean, and the other group about stoichiometric
5. operate the first group of cylinders about stoichiometric, and the other group about stoichiometric
6. operate the first group of cylinders rich, and the other group about stoichiometric 7. operate the first group of cylinders lean, and the other group lean
8. operate the first group of cylinders about stoichiometric, and the other group lean
9. operate the first group of cylinders rich, and the other group lean
10. operate the first group of cylinders lean, and the other group rich
11. operate the first group of cylinders about stoichiometric, and the other group rich
12. operate the first group of cylinders rich, and the other group rich
13. operate the second group of cylinders lean, and the other group inducting gasses without injected fuel;
14. operate the second group of cylinders about stoichiometric, and the other group inducting gasses without injected fuel;
15. operate the second group of cylinders rich, and the other group inducting gasses without injected fuel
16. operate the second group of cylinders rich, and the other group about stoichiometric
17. operate the second group of cylinders rich, and the other group rich
18. operate both the first and second group of cylinders inducting gasses without injected fuel While any of the above modes may be used, selected modes can provide particular advantages, such as described herein, especially depending on the types of sensors used in various locations in the exhaust system. Further, each of these modes can include further variation, such as different VCT timing between cylinder banks, etc. Further, the throttle plate may be in different positions depending on the mode, as well as based on valve and/or cam variation.

Also note that operation at a cylinder fuel-cut condition can provide a practically infinite air-fuel ratio, since substantially no fuel is being injected by the fuel injectors for that cylinder (although there may be some fuel present due to fuel around the intake valves and in the intake port that will eventually decay away). As such, the effective air-fuel ratio may be substantially greater than about 100:1, for example. Although, depending on the engine configuration, it could vary between 60:1 to practically an infinite value. Further, depending on the type of measurement equipment provided, it could have even further variation.

Additional details of control routines are included below which can be used with various engine configurations, such as those described in FIGS. 2A-2D. As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

Figure 3:
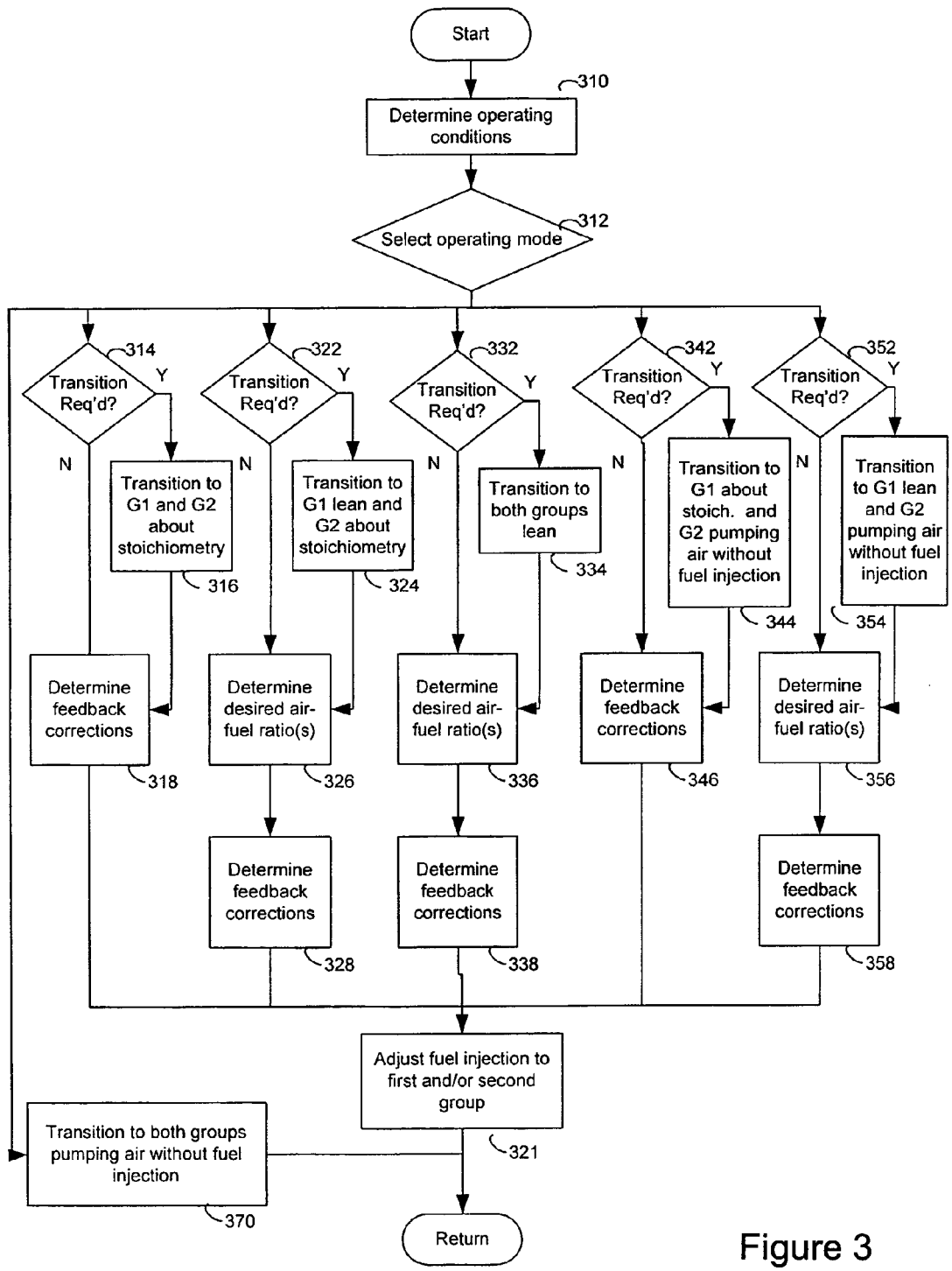
FIGS. 3-4 are high level flow charts showing example routines and methods.

Referring now to FIG. 3, a routine is described for controlling engine operation in various of the modes described above. First, in step 310, the routine determines engine operating conditions. These may include various conditions, including a desired engine output. The desired engine output may be indicated by engine torque, but various other parameters could be used, such as, for example: wheel torque, engine power, engine load, or others. The desired engine output can be based on transmission conditions (e.g., gear ratio, shift condition, torque converter state), driver inputs, cruise control, traction control, vehicle stability control, catalyst and/or exhaust conditions (e.g., catalyst state, catalyst temperature) or others. From at least these conditions and states, the routine selects an operating mode in step 312. As noted above, various modes are available, including operating both cylinder groups to combust an air-fuel mixture about stoichiometry or rich (to 314); operating one group lean and another group about stoichiometry (to 322), operating both groups lean (to 332), operating one group about stoichiometry and the other without fuel injection (to 342), operating one group lean and the other without fuel injection (to 352), or operating both groups without fuel injection (to 370). Note that, as indicated herein, additional cylinder group modes may be used. For example, as described below, one group may be operated lean and another group operated rich to generate exothermic heat in the downstream catalyst.

Continuing with FIG. 3, when the routine continues to step 314 a determination is made as to whether a transition is required. For example, the routine determines whether the current operating mode matched the mode selected in 312. If not, the routine continues to step 316 to transition to the desired mode. Otherwise, the routine continues to step 318 to determine feedback correction amounts for the first and second cylinder groups. In one example, where sensor 230 is a linear type and sensor 234 is a switching type sensor, the upstream sensors (230 and 234) are used for respective air/fuel feedback control in the groups 210 (G1) and 212 (G2). The signal from sensor 230 can be modified to provide a signal similar to switching type sensor, if desired, so that a common control structure can be used for both groups 210 and 212. Alternatively, two independent controllers could be used for the two groups, one using sensor 230 and the other using sensor 232. Further, feedback from downstream sensors may also be applied to the groups. For example, feedback from sensor 232, 238 (if present), and 240 may be applied to fuel injection into group 210, while feedback from sensor 236, 238 (if present), and 240 may be applied to fuel injection into group 212. As noted above, subsets of sensors may be used, and for example, sensor 232, 236, and/or 238, or combinations thereof, may be deleted.

Continuing with FIG. 3, when the routine continues to step 322 a determination is made as to whether a transition is required. For example, the routine determines whether the current operating mode matched the mode selected in 312. If not, the routine continues to step 324 to transition to the desired mode. Otherwise, the routine continues to step 326 to determine the desired lean air-fuel ratio for the lean combusting cylinders. In one embodiment, all cylinders in a group are operated with approximately a common lean air-fuel ratio. However, in another embodiment, each cylinder of the group can be operated at a different lean air-fuel ratio, if desired.

In one example, where sensor 230 is a linear type and sensor 234 is a switching type sensor, cylinder group 210 is selected to perform lean combustion, whereas group 212 is selected to about stoichiometry. In this way, sensor (230) can be used for air/fuel feedback control in group 210 to achieve accurate lean air-fuel ratio control. The signal from sensor 230 can be supplemented with information from other sensors, such as sensor 232, if desired. Further, sensor 234 is used to provide accurate control about stoichiometry for group 212. Again, addition information from other sensors may be included, if desired. The routine then continues to step 328 to determine feedback correction amounts for the first cylinder group.

Continuing with FIG. 3, when the routine continues to step 332 a determination is made as to whether a transition is required. For example, the routine determines whether the current operating mode matched the mode selected in 312. If not, the routine continues to step 334 to transition to the desired mode. Otherwise, the routine continues to step 336 to determine the desired lean air-fuel ratio for the combusting cylinders. In one embodiment, all cylinders in a group are operated with approximately a common lean air-fuel ratio. However, in another embodiment, each cylinder of the group can be operated at a different lean air-fuel ratio, if desired.

In one example, where sensor 230 is a linear type and sensor 234 is a switching type sensor, both cylinder groups 210 and 212 are operated lean, each using feedback from sensor 230. In other words, when the engine is operated lean and sensor 230 is a linear sensor, it can be used to control the overall lean air/fuel ratio for both groups 210 and 212. This can provide improved performance without requiring a linear type senor for each group, since both the groups may be substantially similar and air/fuel ratio measurement in one group can represent the air/fuel ratio of the other bank, at least for transient and/or higher bandwidth conditions. Low frequency, or steady-state, errors or compensation may be provided via the downstream sensors, in one example, such as sensor a linear type sensor 240 in combination with a linear type sensor 230, in one example.

In one embodiment, the air/fuel ratio in group 212 (having a switching type sensor for sensor 234), can be corrected in step 338 by using the signals from a linear type of sensor for sensor 230, where:

Group_212_Error=(UEGO(230)−UEGO(240))

The "Group_212_Error" may be due to the error in the air/fuel ratio in group 212 and represents the fueling error in group 212. The correction to the group 212 air/fuel ratio may be done by correcting the group 212 air/fuel ratio by twice the "Group_212_Error" signal. This is because the signal from a linear type of sensor at sensor 240 measures the air/fuel ratio of the exhaust mass flow-rate twice that of group 212 as the groups 210 and 212 flows are combined before catalyst 224. I.e., the group 210 exhaust can dilute the group 212 exhaust.

Continuing with FIG. 3, when the routine continues to step 342 a determination is made as to whether a transition is required. For example, the routine determines whether the current operating mode matched the mode selected in 312. If not, the routine continues to step 344 to transition to the desired mode. Otherwise, the routine continues to step 346 to perform control about stoichiometry for one of the groups.

In one example, where sensor 230 is a linear type and sensor 234 is a switching type sensor, cylinder group 212 is selected to perform combustion, whereas group 210 is selected to operate without fuel injection. In this way, sensor (234) can be used for air/fuel feedback control in group 212 to accurately control operation about stoichiometry. The signal from sensor 234 can be supplemented with information from other sensors, such as sensor 236, if desired.

Continuing with FIG. 3, when the routine continues to step 352 a determination is made as to whether a transition is required. For example, the routine determines whether the current operating mode matched the mode selected in 312. If not, the routine continues to step 354 to transition to the desired mode. Otherwise, the routine continues to step 356 to determine the desired lean air-fuel ratio for the combusting cylinders. In one embodiment, all cylinders in a group are operated with approximately a common lean air-fuel ratio. However, in another embodiment, each cylinder of the group can be operated at a different lean air-fuel ratio, if desired.

In one example, where sensor 230 is a linear type and sensor 234 is a switching type sensor, cylinder group 210 is selected to perform combustion, whereas group 212 is selected to operate without fuel injection. In this way, sensor (230) can be used for lean air/fuel feedback control in group 210. The signal from sensor 230 can be supplemented with information from other sensors, such as sensor 232, if desired. The routine then continues to step 358 to determine feedback correction amounts for the first cylinder group.

The routine then continues to step 321 to adjust fuel injection to the first and/or second group, as determined in any of steps 318, 328, 338, 346, or 358, to achieve the desired air-fuel ratio in cylinders carrying out combustion.

This, in the situations where sensor 230 is a linear type, and sensor 234 is switching type sensor, alternative partial cylinder cut operation may be used. For example, when lean combustion partial cylinder cut operation is used, which may be demanded torque is in a lower region, the engine is operated by shutting fuel off to one of the groups (e.g., group 212) and the other group (e.g., 210) is operated lean with feedback. Alternatively, when stoichiometric combustion partial cylinder cut operation is used, which may also be when demanded torque is in a lower region (although perhaps less low than lean partial cylinder cut), the engine is operated by shutting fuel off to one of the groups (e.g., group 210) and the other group (e.g., 212) is operated about stoichiometry with feedback.

Thus, improved air-fuel accuracy can be achieved in each mode, without unnecessarily adding more sensor capacity than needed. Further, different groups are operated without fuel injection in different modes, thereby providing improved engine wear compatibility between the groups.

Also note that in any mode where the overall mixture air-fuel ratio is lean of stoichiometry, the engine can periodically switch to operating all of the cylinders stoichiometric or rich. This is done to reduce the stored oxidants (e.g., NOx) in the emission control device(s). For example, this transition can be triggered based on the amount of stored NOx in the emission control device(s), or the amount of NOx exiting the emission control device(s), or the amount of NOx in the tailpipe per distance traveled (mile) of the vehicle.

Further, transitions may be requested to provide even wearing between the cylinder groups.

Figure 4:
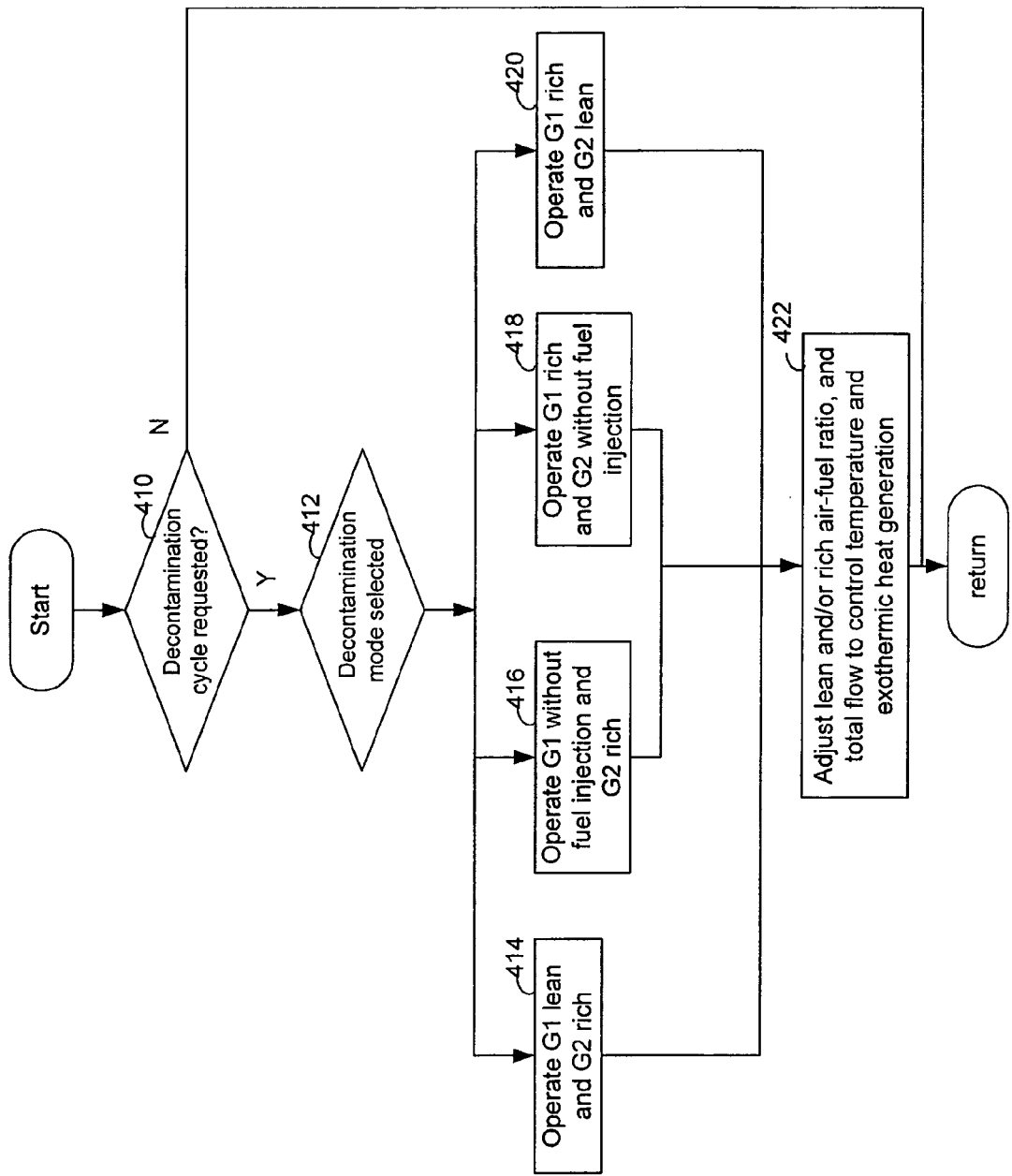

Referring now to FIG. 4, an example routine for controlling decontamination operation, such as desulfurization, is described. Specifically, various heat generation modes are described that may be selected based on a variety of conditions, including those identified with regard to step 310 of FIG. 3. Further, the routine of FIG. 4 applies to the example where sensor 230 is a linear type sensor, sensor 234 is a switching type sensor. Further, in example, sensor 240 may be a linear type sensor, if present.

The decontamination cycle may include raising the catalyst to be decontaminated to a predetermined temperature, and then controlling the exhaust air-fuel ratio in the catalyst. For example, the exhaust air-fuel ratio in (or entering) the catalyst may be modulated about stoichiometry, where the duration of lean/rich operation, and the level of lean/rich operation, may be varied based on temperature and the amount of contaminant (such a sulfur) still remaining in the device.

Continuing with FIG. 4, first, in step 410, the routine determines whether a desulfurization request is made, such as based on a number of miles driven, operating conditions, and/or various other factors. If so, the routine continues to step 412 to select the decontamination mode.

A first example decontamination mode is described with regard to step 414. In one embodiment, this mode operates with cylinder group 210 (G1) lean and cylinder group 212 (G2) rich. The level of the lean air-fuel ratio of group 210 may be controlled by information from a linear sensor as sensor 230. The overall air-fuel ratio, and thus the rich air-fuel ratio in group 212 can be adjusted via downstream sensor 240. In this way, improved heat generation and temperature control can be achieved in step 422.

A second example decontamination mode is described with regard to step 416. In one embodiment, this mode operates with cylinder group 210 inducting air without injected fuel and cylinder group 212 rich. The level of the rich air-fuel ratio of group 212 and the overall air-fuel ratio, can be adjusted via downstream sensor 240 in step 422.

A third example decontamination mode is described with regard to step 418. In one embodiment, this mode operates with cylinder group 210 (G1) rich and cylinder group 212 (G2) inducting air without injected fuel. The level of the rich air-fuel ratio of group 210 may be controlled by information from a linear sensor as sensor 230. The overall air-fuel ratio can be further adjusted via downstream sensor 240, if desired. In this way, improved heat generation and temperature control can be achieved in step 422.

A fourth example decontamination mode is described with regard to step 418. In one embodiment, this mode operates with cylinder group 210 (G1) rich and cylinder group 212 (G2) lean. The level of the rich air-fuel ratio of group 210 may be controlled by information from a linear sensor as sensor 230. The overall air-fuel ratio, and thus the lean air-fuel ratio of group 212 can be further adjusted via downstream sensor 240, if desired. In this way, improved heat generation and temperature control can be achieved in step 422.

Figure 5:
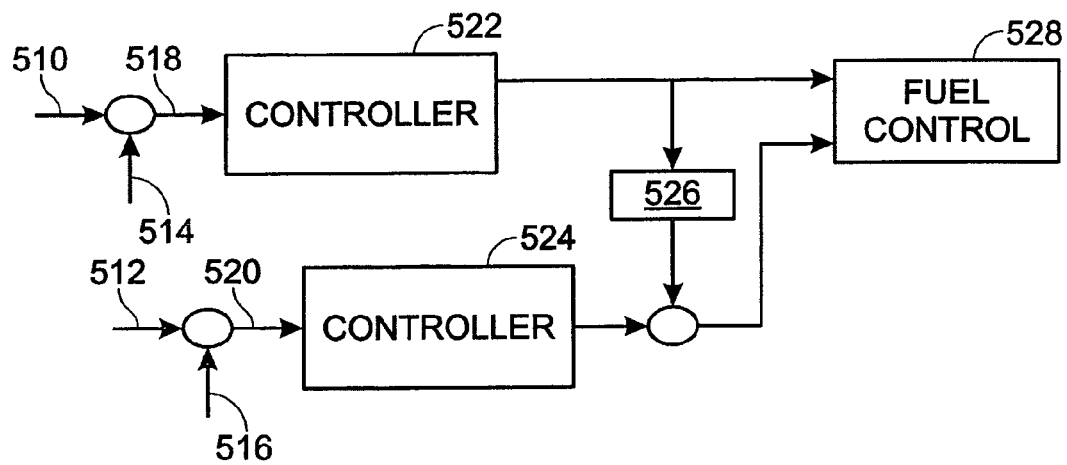
FIG. 5 is a high level block diagram showing an example routine and method.

Referring now to FIG. 5, an example control system is provided illustrating interaction between different cylinder groups, one having a linear type sensor and one having a switching type sensor. Specifically, the desired air-fuel ratio for a first group (with the linear type sensor) is marked at 510, where the desired air-fuel ratio for a second group (with the switching type sensor) is marked at 512. The desired values are compared with measured values of the linear and switching type sensor, respectively, at 514 and 516. The respective differences (518 and 520) are fed to respective controllers 522 and 524. Specifically, block 522 represents a controller for a first group of cylinders, whereas block 524 represents a controller for a second group of cylinders. Further, the difference in the adjustment control signals for the linear group is multiplied by 0.5 at block 526 and to be compared with the switching bank control signal, before being feed to the fuel control at block 528.

In this way, the output from the linear type sensor controller is attenuated and applied to the second bank to improve the compensation for common mode disturbances between the groups (applied to both groups), such as fuel vapor purging, transient fuel disturbances, manifold filling disturbances, fuel volatility, etc.

As noted in various examples above, when engine 10 is equipped with an asymmetrical sensor set, (e.g., a linear type sensor measuring exhaust of a first group of cylinders and a switching sensor measuring exhaust of a second group of cylinders), it may be desirable to use information from both types of sensor when applicable on each of the groups. For example, the first group may utilize information from both sensors under some conditions (e.g., when operating about stoichiometry) and the second group may utilize information from both sensors under some conditions (e.g., when operating about stoichiometry and/or lean). In this particular case, the linear type sensor can provide information about the magnitude of an air fuel disturbance that the switching sensor may not indicate. Further, many of the disturbances that affect the air-fuel ratio of an engine may affect both banks at the same time. For example, carbon canister purge, transient fuel errors, errors cause by air meter inaccuracy, fuel pressure inaccuracy, and others. By using the magnitude information from the linear type sensor, compensation for common mode disturbances can be made on both banks in less time, as noted above herein.

Figure 6:
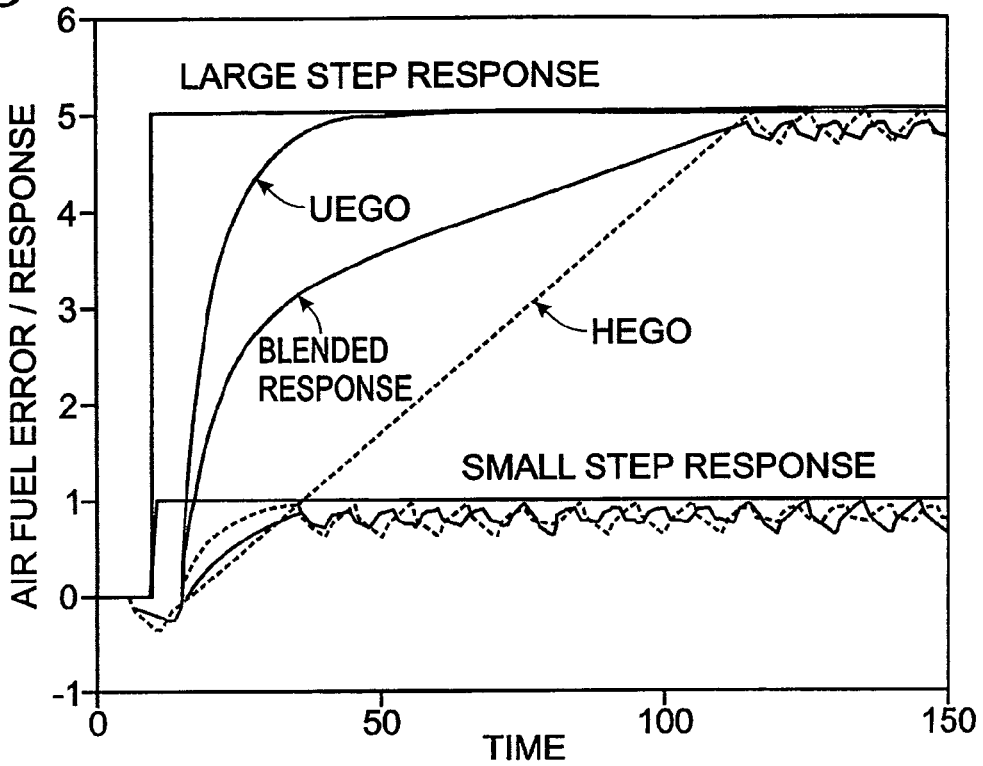
FIGS. 6-7 are simulated engine and control response data for example embodiments.

In another embodiment, the sensor outputs may be combined, or the output from the controllers using the sensor outputs may be combined using a weighting factor. This gives an output similar to that shown in FIG. 6, which shows a blended response from both a linear and switching type sensor with group to group differences.

Figure 7:
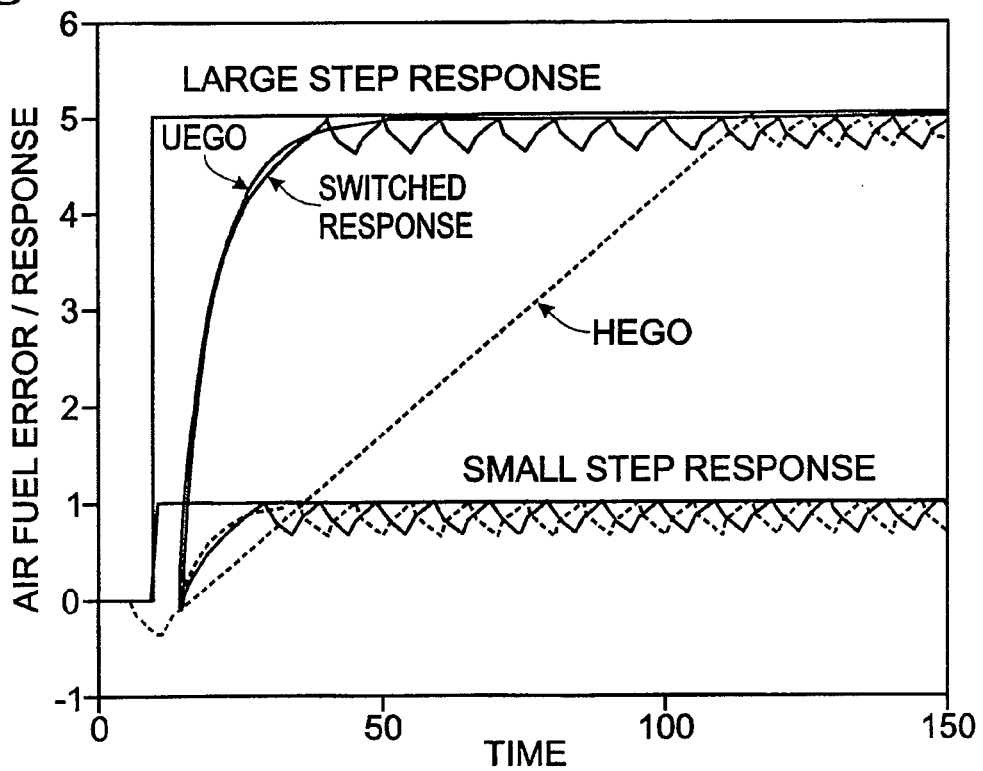

In still another embodiment, for the switching group of cylinders, the controller can calculate a closed loop correction for both groups using, for example, a P-I controller for both the linear and switching sensor (where the switching sensor results in what may be referred to as a jump and ramp). Then the controller can compare the direction and magnitude of the change in the controller outputs. If the direction of change is the same for both groups of cylinders, it can be assumed that there is a common mode disturbance that may be corrected by adjusting fueling accordingly. If so, and the delta change from the linear type sensor group controller is larger, it can overwrite the output of the closed loop controller for the switching bank by the larger of the two delta changes. This can provide an increased response to large disturbances without disabling the normal limit cycle of the switching type sensor controller. Such an example is illustrated in FIG. 7, which shows the response with group to group differences.

It will be appreciated that the configurations and routines disclosed herein are exemplary in nature, and that these specific embodiments are not to be considered in a limiting sense because numerous variations are possible. The subject matter of the present disclosure includes all novel and nonobvious combinations and subcombinations of the various system and exhaust configurations, algorithms, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A system for a vehicle traveling on the road, the system comprising:
 a first cylinder;
 a second cylinder;
 a linear exhaust gas sensor coupled exclusively to said first cylinder;
 a switching exhaust gas sensor coupled exclusively to said second cylinder; and
 a controller configured to operate in a first mode with both said first and second cylinders carrying out lean combustion, where fuel injection amounts to each of said first and second cylinder are adjusted based on said linear sensor; said controller further configured to operate in a second mode with both said first and second cylinders carrying out combustion about stoichiometry, where fuel injection amounts to at least one of said first and second cylinder are adjusted based on said switching sensor.

2. The system of claim 1 wherein said linear and switching sensors are located downstream of a catalyst.

3. The system of claim 1 wherein said linear sensor is located upstream of a catalyst.

4. The system of claim 3 wherein said switching sensor is located upstream of a catalyst.

5. The system of claim 4 wherein said vehicle is a passenger vehicle.

6. The system of claim 5 wherein the first cylinder is coupled in a first cylinder group, and where the cylinders in the first cylinder group are coupled exclusively to the linear sensor, and wherein the second cylinder is coupled in a second cylinder group, and where the cylinders in the second cylinder group are coupled exclusively to the switching sensor, and where fuel to both cylinder groups is adjusted based on said switching type sensor during said second mode.

7. A system for a vehicle traveling on the road, the system comprising:
   a first cylinder;
   a second cylinder;
   a linear exhaust gas sensor coupled exclusively to said first cylinder;
   a switching exhaust gas sensor coupled exclusively to said second cylinder; and
   a controller configured to operate in a first mode with said first cylinder carrying out lean combustion and said second cylinder operating without injected fuel, where fuel injection amounts to said first cylinder are adjusted based on said linear sensor; said controller further configured to operate in a second mode with said second cylinder carrying out combustion about stoichiometry and said first cylinder operating without injected fuel, where fuel injection amounts to said second cylinder are adjusted based on said switching sensor.

8. The system of claim 7 wherein said linear and switching sensors are located downstream of a catalyst.

9. The system of claim 7 wherein said linear sensor is located upstream of a catalyst.

10. The system of claim 9 wherein said switching sensor is located upstream of a catalyst.

11. The system of claim 10 wherein said lean operation includes operating leaner than about 18:1 at least once.

12. A system for a vehicle traveling on the road with an engine, the system comprising:
    a first cylinder of the engine;
    a second cylinder of the engine;
    a linear exhaust gas sensor coupled exclusively to said first cylinder;
    a switching exhaust gas sensor coupled exclusively to said second cylinder; and
    a controller configured to adjust a fuel injection amount to one of the cylinders based on exhaust gas measurements from the sensor not coupled to said cylinder;
    wherein the controller is further configured to operate in a second mode with said second cylinder carrying out combustion about stoichiometry and said first cylinder operating without injected fuel, where fuel injection amounts to said second cylinder are adjusted based on said switching sensor.

13. The system of claim 12 wherein:
    the controller is further configured to operate in a first mode with said first cylinder carrying out lean combustion and said second cylinder operating without injected fuel, where fuel injection amounts to said first cylinder are adjusted based on said linear sensor.

14. The system of claim 12 wherein:
    the controller is further configured to operate in a fifth mode where fuel injection amounts to at least one of said first and said second cylinders are adjusted based on combined information from both of said linear and switching sensors.

15. The system of claim 12 wherein:
    the controller is further configured to operate in a third mode with both said first and second cylinder carrying out lean combustion, where fuel injection amounts to both said first and said second cylinders are adjusted based on said linear sensor.

16. The system of claim 15 wherein said linear and switching sensors are located downstream of a catalyst.

17. The system of claim 12 wherein:
    the controller is further configured to operate in a fourth mode with both said first and second cylinder carrying out combustion about stoichiometry, where fuel injection amounts to both said first and said second cylinders are adjusted based on said switching sensor.

18. The system of claim 17 wherein said linear sensor and said switching sensor are located up stream of a catalyst.

19. A system for a vehicle traveling on the road, the system comprising:
    a first cylinder;
    a second cylinder;
    a linear exhaust gas sensor coupled exclusively to said first cylinder;
    a switching exhaust gas sensor coupled exclusively to said second cylinder; and
    a controller configured to operate with both said first and second cylinders carrying out combustion, where a fuel injection amount to at least one of said first and second cylinders is adjusted based on at least one of said linear sensor and said switching sensor in a first mode, where fuel injection amounts to both cylinders are adjusted based on combined information from both of said linear and switching sensors in a second mode.

20. The system of claim 19 wherein fuel injection amounts in said second mode are adjusted based on a comparison of information from both of said linear and switching sensors, said information including a direction of change and magnitude of change.

21. A system for a vehicle traveling on the road with an engine, the system comprising:
    a first cylinder of the engine;
    a second cylinder of the engine;
    a linear exhaust gas sensor coupled exclusively to said first cylinder;
    a switching exhaust gas sensor coupled exclusively to said second cylinder; and
    a controller configured to adjust a fuel injection amount to one of the cylinders based on exhaust gas measurements from the sensor not coupled to said cylinder;
    wherein the controller is further configured to operate in a fourth mode with both said first and second cylinder carrying out combustion about stoichiometry, where fuel injection amounts to both said first and said second cylinders are adjusted based on said switching sensor.

* * * * *